G. D. GATLING.
BABY CARRIER.
APPLICATION FILED FEB. 25, 1922.

1,435,115.

Patented Nov. 7, 1922.

G. D. Gatling.
INVENTOR

BY Victor J. Evans
ATTORNEY

WITNESS:

Patented Nov. 7, 1922.

1,435,115

UNITED STATES PATENT OFFICE.

GLADSTONE DAUGHTRY GATLING, OF GATES, NORTH CAROLINA.

BABY CARRIER.

Application filed February 25, 1922. Serial No. 539,206.

*To all whom it may concern:*

Be it known that I, GLADSTONE D. GATLING, a citizen of the United States, residing at Gates, in the county of Gates and State of North Carolina, have invented new and useful Improvements in Baby Carriers, of which the following is a specification.

The object of my present invention is to improve the type of baby carriers that is adapted to be hung at the back of an automobile or car seat, the improvement residing in means whereby the carrier may be nicely fitted to seat backs of various lengths and thicknesses.

To the attainment of the foregoing, the invention consists in the improvement as hereinafter described and definitely claimed.

In the accompanying drawings, forming part of this specification:—

Similar numerals of reference designate corresponding parts in all of the views of the drawings.

Figure 1:
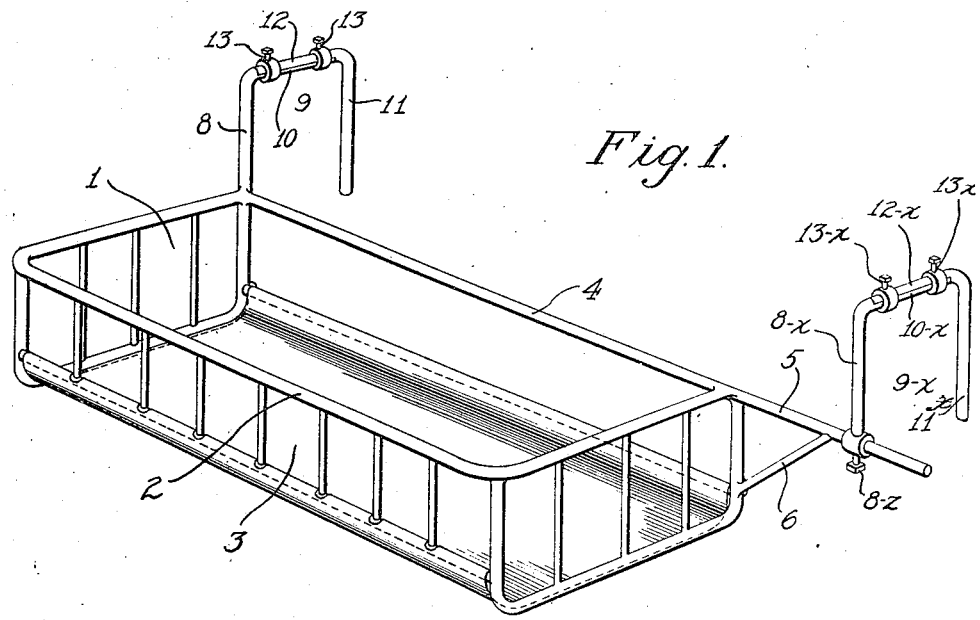
Figure 1 is a perspective of my novel baby carrier per se.
Figure 2:
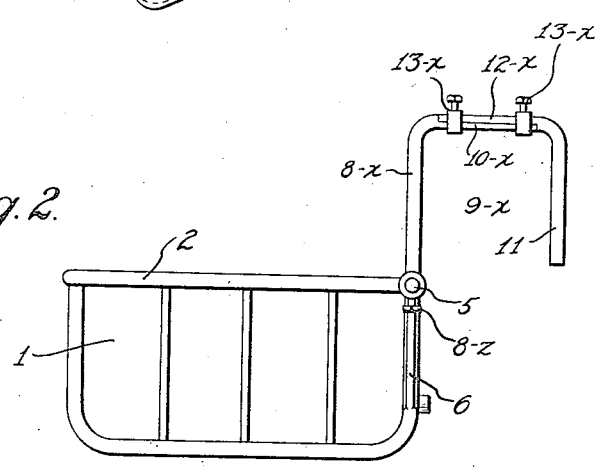
Figure 2 is an end elevation of the carrier.
Figure 3:
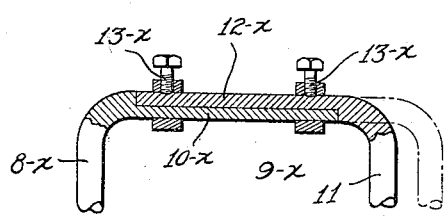
Figure 3 is an enlarged detail view showing the manner in which the sections of the hangers are adjustably fixed with respect to each other.

Among other elements my novel baby carrier comprises a cradle-like body 1 made up of a rectangular frame, designated by 2 and a bottom 3 which latter may be and preferably is formed of canvas or web strips or in one piece of canvas or other appropriate textile material.

The upper longitudinal bar 4 at the back of the body frame 1 is extended beyond one end of the body frame, as designated by 5, and the extended portion of said bar is supported by a brace 6 integral with and interposed between or otherwise fixed to the frame 2 and the extended bar portion 5.

At the end of the body frame 1 remote from the bar portion 5 the rear corner post of the body frame is extended upwardly as designated by 8, to form one section of a hanger 9, the said section 8 being provided with a horizontally disposed arm 10 at its upper end. In combination with the said post 8 and arm 10 I employ a member 11 with an arm 12 at its upper end, the said arm 12 being arranged in lapped relation to the arm 10 and adjustably connected thereto at one or more points as designated by 13. Manifestly with the construction described the hanger 9 may be adjusted and adjustably fixed to snugly straddle and fit seat backs of various thicknesses on automobiles or cars.

On the extended bar portion 5 I provide a hanger $9^x$. This hanger $9^x$ comprises a post $8^x$ adjustable on the bar portion 5 in the direction of the length thereof and adjustably fixed thereto through the medium of a set screw $8^z$. This provision manifestly renders it feasible to fit the baby carrier on seat backs of various lengths. The hanger member $8^x$ is provided at its upper end with an arm $10^x$, and arranged in lapped relation to the bar $10^x$ and adjustably fixed thereto at $13^x$ is an arm $12^x$ on the other member $11^x$ of the hanger.

It will be readily apparent from the foregoing that the hangers 9 and $9^x$ of my novel baby carrier may be expeditiously and easily adapted to seat backs of various thicknesses, while the hanger $9^x$ may be adjusted as a unit and adjustably fixed to seat backs of various lengths. It will also be manifest that while the arms 10 and $10^x$ bear on the upper edge of a seat back to support the carrier, the members 11 and $11^x$ may be adjusted tight against the front of the seat back and may then be adjustably fixed with respect to the other members of the hangers to securely fasten the carrier on the back.

In addition to the advantages hereinbebore ascribed to my novel carrier it will be observed that the carrier is simple and inexpensive in construction and when nickel plated or otherwise embellished is calculated to enhance rather than detract from the finished appearance of an automobile.

I have entered into a detailed description of the construction and relative arrangement of the parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claim.

Having described my invention, what I claim and desire to secure by Letters-Patent is:—

A baby carrier including a body frame having a rear corner post extended above the major portion of the frame and terminating in a lateral arm and also having a rear back bar extended longitudinally beyond the opposite end of the frame and appropriately braced, a hanger member having a lateral arm arranged in lapped relation to and adjustably fixed to the first-named lateral arm, a hanger member adjustably fixed to and rising from the said extended portion of the bar and terminating in a lateral arm, and a hanger member having a lateral arm arranged in lapped relation to and adjustably fixed to the last-named lateral arm.

In testimony whereof I affix my signature.

GLADSTONE DAUGHTRY GATLING.